United States Patent [19]

Cimino et al.

[11] Patent Number: 4,650,733

[45] Date of Patent: Mar. 17, 1987

[54] LOW IMPEDANCE FILTER BATTERY WITH EFFECTIVE ELECTROLYTE SEAL

[75] Inventors: Michael B. Cimino, Green River, Wyo.; Gregory M. Gearing, Dayton, Ohio

[73] Assignee: The United States of America as represented by the Secretary of the Air Force, Washington, D.C.

[21] Appl. No.: 792,099

[22] Filed: Oct. 28, 1985

[51] Int. Cl.⁴ .............................................. H01M 2/24
[52] U.S. Cl. ...................................... 429/153; 429/160
[58] Field of Search ................ 429/152, 153, 154, 160

[56] References Cited

U.S. PATENT DOCUMENTS

| | | | |
|---|---|---|---|
| 1,285,660 | 11/1918 | Ford | 429/153 |
| 3,746,940 | 7/1973 | Walk et al. | 317/230 |
| 4,154,908 | 5/1979 | Menard | 429/206 |
| 4,215,184 | 7/1980 | Gutmann et al. | 429/101 |
| 4,242,179 | 12/1980 | Fritts et al. | 204/2.1 |
| 4,321,315 | 3/1982 | Jensen | 429/152 |
| 4,439,465 | 3/1984 | Reid et al. | 427/115 |
| 4,471,038 | 9/1984 | Vyas | 429/198 |

FOREIGN PATENT DOCUMENTS 2138707 2/1973 Fed. Rep. of Germany ...... 429/152

OTHER PUBLICATIONS

AFWAL-TR-84-2094 "Pseudo Bipolar Nickel-Cadmium Batteries Used as Filter Elements to Pulsed Current Loads", Nov. 84, Michael B. Cimino and Gregory M. Gearing.

*Primary Examiner*—Donald L. Walton
*Attorney, Agent, or Firm*—Gerald B. Hollins; Donald J. Singer

[57] ABSTRACT

A lightweight, high energy density, secondary cell battery suited for use as a battery filter element in an electrical network, particularly in space mission hardware. A pseudo-bipolar cell configuration with simple, effective electrolyte sealing and low electrical impedance characteristics is included, along with a sequence for fabricating and assembling a preferred cell arrangement.

22 Claims, 7 Drawing Figures

LOW IMPEDANCE FILTER BATTERY WITH EFFECTIVE ELECTROLYTE SEAL

RIGHTS OF THE GOVERNMENT

The invention described herein may be manufactured and used by or for the Government of the United States for all governmental purposes without the payment of any royalty.

CROSS-REFERENCE TO RELATED APPLICATION

This application is related to an application titled "Pulse Power Supply Filtering With Rechargeable Battery Element", applicants' Ser. No. 792,098, filed of even date herewith.

BACKGROUND OF THE INVENTION

This invention relates to the field of secondary or rechargeable batteries and the arrangement of such batteries to achieve improved electrical and physical characteristics capable of use as an electrical filter element and in other energy storage uses.

In space satellite vehicles and other volume limited and weight limited environments wherein a pulsating load current and a pulsed source of electrical energy or a source of electrical energy of limited current delivering capability are to be married into a direct current operated system, the need arises for an energy storing electrical filter element of higher energy density capability than has been heretofore available—an energy storage density of significantly improved capability with respect to the conventionally used electrolytic capacitor. In space satellite vehicles of relatively large electrical energy size, weight savings in the order of 5,000 lbs together with significant volume savings are envisioned with use of the improved electrical energy storage arrangement afforded by the present invention battery filter element.

The conventional electrolytic capacitor is usually operated under energy storage conditions which achieve about 1 joule of electrical energy storage per pound of capacitor weight. Conventional nickel-cadmium batteries when used in lieu of such electrolytic capacitors in power supplies are found capable of energy storage densities as high as 10 joules per pound. The presently disclosed battery filter element, in contrast, is capable of operation in the 40 joules per pound storage density range with the suggestion of even larger energy per pound operation.

For electrical waveform filtering and for use in small size, low electrical impedance power supply sources, a form of secondary cell or rechargeable battery known as the bipolar electrode battery is considered especially attractive. In a bipolar battery the positive electrode of one battery cell and the negative electrode of the adjacent battery cell are formed on opposite sides of the same plate or substrate member. A battery of such cells is therefore comprised of a plurality of these bipolar plates with each plate face being exposed to a segregated quantity of battery electrolyte—electrolyte also exposed to the next plate of opposite polarity in a battery array of cells. The necessary segregation of adjacent cell electrolyte quantities, however, provides one of the principal disadvantages of such a bipolar battery structure, i.e., the effective and permanent segregation of adjacent electrolyte quantities, particularly at the periphery of a bipolar electrode plate has proven to be a difficult accomplishment. Despite this significant practical problem the low cell interconnection resistance and inductance and the low intra-cell impedances of the bipolar battery are attractive for many uses, including the filtering needed in a power supply. In the bipolar cell, the relatively large surface areas contribute to low cell interconnecting resistance and to small electrode to electrolyte resistances. The large areas and short direct cell interconnections also afford light weight and small size for a given cell electrical capacity. The low interconnecting resistance is at least in part attributable to the absence of separate cell interconnection conductors such as the familiar straps between cells in the six-volt automobile storage battery. In the bipolar battery structure, cell interconnection occurs between the oppositely polarized sides of a given battery plate member, that is, between the positive electrode material on one side of a plate structure and the negative electrode material on the opposite side of a plate structure.

The sealing of a bipolar electrode plate against electrode leakage between adjacent cell electrolyte quantities is a complex problem involving such considerations as plate dimensional change as a result of battery temperature change, molecular transfer of electrolyte through the porous paste layers of an electrode in the case of paste electrodes carried on a wire mesh or other permeable substrate structure, and relatively large plate and seal dimensions—on the order of three-inch plate diameter for a battery of moderate current delivering capability and life. The sealing also involves a dense liquid electrolyte of significant wetting property and high chemical activity—electrolytes of such solutions as sulfuric acid and potassium hydroxide are commonly employed, and also requires practical and easy manufacture without the use of tedious, long-duration seal achieving fabrication steps.

Additional information concerning the bipolar battery and also information concerning the construction, testing, and characteristics of the semi-bipolar battery of the present invention are included in a technical report titled "Pseudo-Bipolar Nickel-Cadmium Batteries used as Filter Elements to Pulsed Current Loads", AFWAL-TR-84-2094, written by Michael B. Cimino and Gregory M. Gearing of the Energy Conversion Branch, Aerospace Power Division, Aero Propulsion Laboratory, Air Force Wright Aeronautical Laboratories, Air Force Systems Command, Wright-Patterson Air Force Base, Ohio, 45433. The Cimino-Gearing technical report is unclassified and unrestricted in distribution and is available from the above address, and from the National Technical Information Service. The disclosure of this report is also included in a thesis submitted to the Air Force Institute of Technology, Wright-Patterson Air Force Base, Ohio, 45433 in partial fulfillment of the requirements for the Master of Science Degree. The substance of the AFWAL technical report, the Air Force Institute of Technology thesis and the disclosure of the copending patent application "Power Supply Filtering With Rechargeable Battery Element" referred to above are hereby incorporated by reference into the present specification. An article referenced in the AFWAL technical report. "Batteries for Space Power Systems", written by P. Bauer of the National Aeronautics and Space Administration in 1968, NASA SP 172, provides additional details of the bipolar battery and additional background information regarding batteries suitable for use in satellite vehicles and other space hardware. The Bauer article is also incorporated herein by reference.

The battery of the present invention approaches the advantages of the bipolar battery while also providing a feasible and practically achievable alternative for the electrolyte sealing difficulties that have been associated with bipolar batteries while also providing other advantages.

The patent art includes several examples of battery arrangements. Included in this art is the patent of Brijesh Vyas, U.S. Pat. No. 4,471,038, which concerns a nickel-cadmium battery improved through the addition of organic polymer compounds to one of the battery electrodes. This art also includes the patent of Margaret A. Reid, U.S. Pat. No. 4,439,465, which concerns a method for making a lightweight substrate or plaque usable in a battery or fuel cell.

The U.S. patent of Claude J. Menard, U.S. Pat. No. 4,154,908, concerns an electrode configuration for alkaline batteries wherein shapes enabling use of unequal amounts of electrode material on the electrodes of different polarity are provided in order to obtain improved battery cycle life and superior volumetric energy density. The Menard patent principally concerns silver-zinc, silver-cadmium, and nickel-zinc batteries and teaches the use of potassium hydroxide as an electrolyte. This patent is also concerned with increasing the number of discharge cycles and the depth of discharge endurance characteristics of a battery. The Menard patent is also concerned with electrode shape change or the migration of active material between different regions of an electrode.

The patent of Gunter Gutmann, U.S. Pat. No. 4,215,184, concerns an improved cell arrangement for nickel-oxide/hydrogen battery cells which achieves improves heat transfer in the axial direction of the battery cell through a reduction of the number of elements in a cell stack.

The patent of David H. Fritts et al, U.S. Pat. No. 4,242,179, concerns a method for fabricating cadmium electrodes usable in nickel-cadmium and silver-cadmium batteries, for example. The Fritts patent achieves an improved dual loading of the cadmium material without surface buildup and eliminates some of the electrode processing steps previously required. The disclosure of the Fritts patent is incorporated herein by reference.

The patent of C. R. Walk et al, U.S. Pat. No. 3,746,940, concerns a cadmium coulometer of the non-aqueous type—an electrolytic cell device usable for such non-battery purposes as measuring plating accomplishment, as an electroplating cell, or for timing purposes. The electrolytic nature and the electrolytic cell enclosure of the Walk patent are in some ways similar to battery structures.

SUMMARY OF THE INVENTION

An object of the present invention is to provide a high density, low electrical impedance battery suitable for use in electrical waveform filtering networks contained within spacecraft, aircraft, and other size and weight limited apparatus.

Another object of the invention is to provide a battery cell structure capable of operating under the demanding conditions of high density, high current flow, and high energy storage in power supply filter use.

Another object of the invention is to provide a battery cell structure capable of improved service life when operated under the demanding conditions of battery filter element sevice.

Another object of the invention is to provide a battery cell interconnecting arrangement which is capable of being easily and reliably sealed against inter-cell electrolyte leakage and therefore against current flow around the cell.

Another object of the invention is to provide a battery filter element which achieves desirably low internal impedance through the use of centrally located cell interconnections.

Another object of the invention is to achieve radially oriented large area current flow within the electrode structure between a cell interconnector and the electrode active material in a battery cell.

Another object of the invention is to provide a high current low impedance battery of small physical size and convenient low-cost manufacturing capability.

Another object of the invention is to provide a secondary cell battery having desirable properties in the three interrelated areas of depth of discharge, energy density per unit of weight, and charge/discharge cycle life.

Additional objects and features of the invention will be understood from the following description and the accompanying drawings.

These and other objects of the invention are achieved by a low impedance electrical filter battery apparatus having a peripheral enclosure member, a separation wall member located centrally within the peripheral enclosure member, sealed with the enclosure member at a separation wall perimeter portion and defining first and second battery cell cavity receptacles within the enclosure member, a first battery cell electrode of a first electrical polarity located within the first battery cell cavity receptacle adjacent a first face of the separation wall member, a second battery cell electrode of second electrical polarity located within the second battery cell cavity receptacle adjacent the second face of the separation wall member, an electrically conductive connector member coupled with a central portion of the first cell electrode in the first battery cell cavity receptacle, passing through an aperture central of the separation wall member and coupled with a central portion of the second cell electrode in the second battery cell cavity receptacle, an arrangement for sealing the electrically coupled connector member with the separation wall member central aperture for precluding electrolyte transfer and electrolyte current flow between the cavity receptacles, a third battery cell electrode of the second electrical polarity located within the first battery cell cavity receptacle adjacent the first electrode and separated therefrom by a porous separator member, a fourth battery cell electrode of the first electrical polarity located within the second battery cell cavity receptacle adjacent the second electrode and separated therefrom by a porous separator member, first and second quantities of battery cell electrolyte located intermediate the first and third and the second and fourth electrodes in the first and second cell cavities, respectively, and an arrangement for communicating electrical current with the third and fourth cell electrodes.

DETAILED DESCRIPTION

Figure 1:
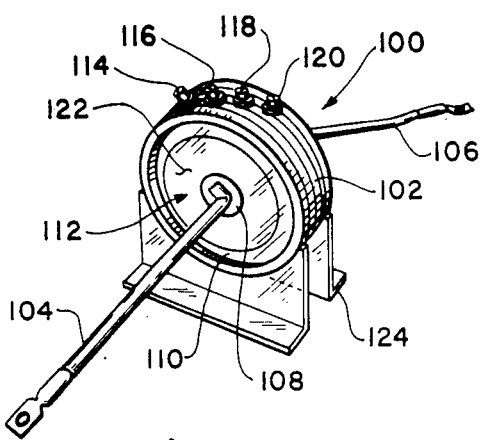
FIG. 1 is an overall view of a battery filter element according to the present invention.

FIG. 1 in the drawings shows an overall view of a battery filter element made in accordance with the present invention. In FIG. 1 the battery filter element 100 is shown to include a circular enclosure member 102, an array of battery cell electrodes 112, a pair of electrically conductive lead members 104 and 106, an electrode to lead interconnecting member 108, and a plurality of electrode separator members, one of which is indicated at 110. The FIG. 1 battery filter element also includes four pressure relief venting members 114, 116, 118, and 120, each communicating with an individual cell cavity receptacle of the battery filter element 100, an enclosure capping member 122, and a mounting stand 124. The configuration of the battery filter element shown in FIG. 1 is, of course, one of several such arrangements which could be used within the spirit of the invention.

The term "battery filter element" as used herein indicates an electrical energy storage device suitable for use as a charge storage or energy storage element in an electrical wave filter network and also as an electrical energy supplying battery. In the electrical wave filter utilization of the described apparatus, energy storage and depletion is contemplated to occur at relatively fixed voltage and high current rates and to involve such considerations as depth of discharge (DOD), battery cycle life, and stored energy density.

Figure 3:
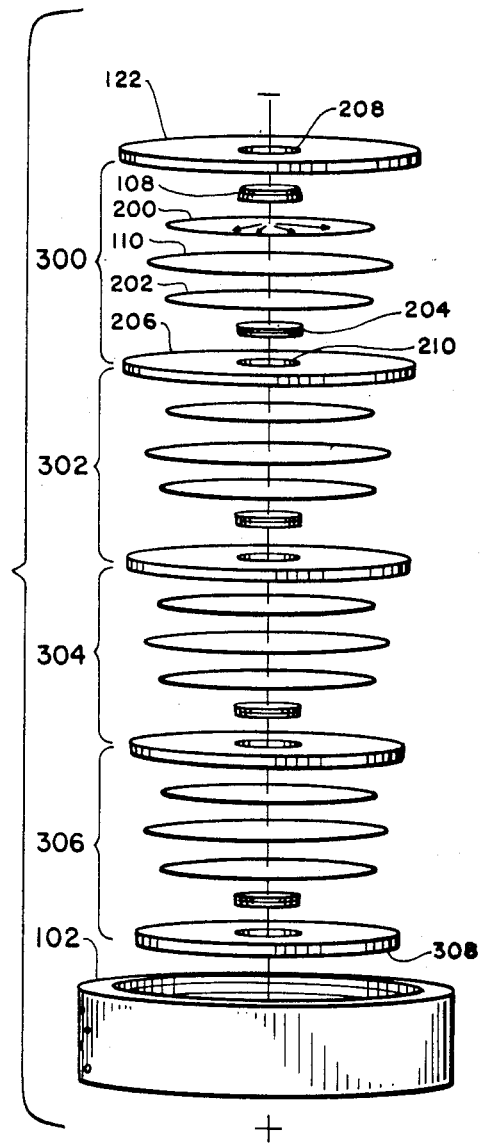
FIG. 3 is an exploded diagrammatic view of several cells used in the FIG. 1 battery filter element.
Figure 2:
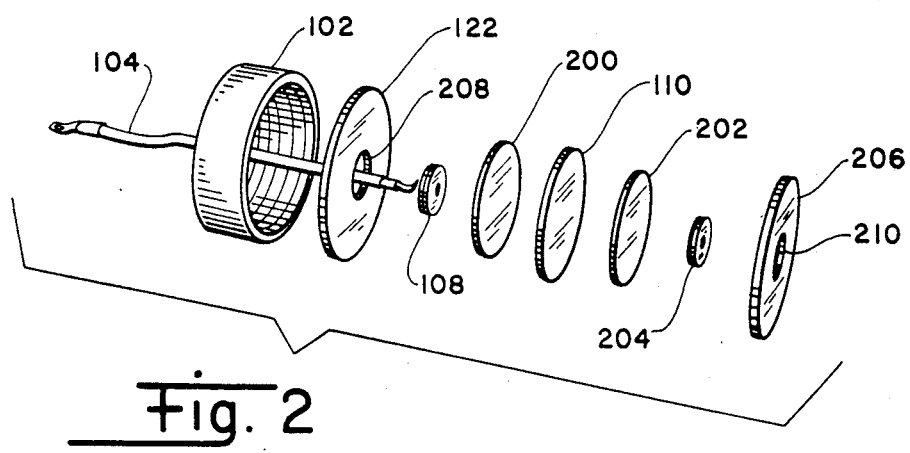
FIG. 2 is an exploded view of the battery housing and the elements of one cell in the FIG. 1 battery filter element.

FIGS. 2 and 3 of the drawings show additional details of the battery filter element 100, including expanded views of a single cell of the battery filter element 100 in FIG. 2 and an expanded view of the four cells of the battery filter element in FIG. 3. In each of these Figures, elements identified numerically in FIG. 1 are identified with the same number as used in FIG. 1. Additional details not shown in FIG. 1 are added with 200 series numbers in FIG. 2 and 300 series numbers in FIG. 3.

In FIG. 2 the components used in one cell of the battery filter element 100 in FIG. 1 are shown in greatest detail. These components include in cell assembly order, the enclosure member 102, the enclosure capping member 122, the electrically conductive lead 104, the electrode to lead interconnecting member 108, a first electrode member 200 of positive electrode polarity, the electrode separator 110, a second electrode member 202 of negative polarity, a cell to cell electrode interconnecting member 204, and a cell separation wall member 206.

In FIG. 3 the FIGS. 1 and 2 identified cell elements are shown in conjunction with the similar elements comprising three additional cells of the battery filter elements 100. The additional three cells shown in FIG. 3 are identified with the numbers 302, 304 and 306 and the originally described cell from FIGS. 1 and 2 is identified with the number 300. The number of cells employed in the FIG. 3 embodiment of the invention is, of course, optional, each cell providing in the range of one to two volts of output, depending upon the type of electrode materials and electrolyte selected. For a nickel-cadmium embodiment of the invention with four cells included, the FIG. 3 arrangement provides a nominal output voltage of 4×1.2, or 4.8, volts. In such a nickel-cadmium embodiment the electrode 200 is negative in polarity and is comprised of cadmium material, and the positive electrode is comprised of nickel material. In both of the electrodes 200 and 202, the electrode structure is preferably formed by impregnating a wire mesh substrate member with finely-divided particle pastes of the electrode material.

For laboratory embodiments of the present invention, fabrication of the circular enclosure member 102 from an acrylic polymer or clear plastic material such as commercial Plexiglas TM has been found satisfactory. Materials of this type are both resistant to chemical attack, easily machined, and when necessary, can be polished to enable viewing of the enclosed cell electrodes and electrolyte materials.

Figures 5, 6:
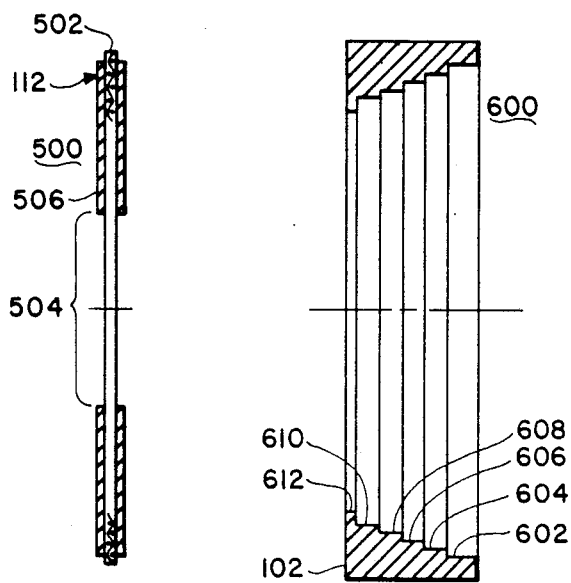
FIG. 5 is a cross-sectional view of a typical electrode member in the FIG. 1 battery filter element.
FIG. 6 is a cross-sectional view of the housing or enclosure member of the FIG. 1 battery filter element.

As suggested by the expanded views of FIGS. 2 and 3, the enclosure member 102 and the internal components of the battery filter element are preferably collected in an ordered sequence and according to successively smaller diameters before closing is achieved with the capping member 122. The successively different diameters for the different cells of the battery filter element 100 are indicated in the enclosure member cross-sectional view of FIG. 6. As shown in FIG. 6, the enclosure member 102 preferably includes the internal areas or portions 602, 604, 606, 608, 610 and 612; each of slightly smaller diameter than the preceding area. The areas 604, 606, 608, and 610 are each contemplated to receive one cell of the four-cell battery filter element shown in FIG. 3. The portion 604, for example, is contemplated to receive a positive and negative pair of electrodes of the type shown at 200 and 202, along with an electrode separator 110, and a separation wall member of the type indicated at 206.

If the separation wall member 206 is fabricated from the above indicated acrylic polymer material along with the enclosure member 102, a solvent for this material such as dichloromethane or an adhesive having desirable bonding properties with respect to the selected material, can be used for sealing the periphery of the cell separation wall members with the appropriately diametered portions 604, 606, 608, and 610. A similar solvent or sealant arrangement can be used for the outermost cell separation wall members, that is, the exterior facing enclosure capping members indicated at 122. For the above-identified acrylic polymer materials, a solvent capable of dissolving the polymer or suspending the polymer material temporarily in a liquid solution such as the above-indicated dichloromethane can provide a satisfactory bonding between the separation wall and capping members and the enclosure member. Depending upon the type of material selected for the enclosure member 102, thermal sealing may also be usable for joining the separation wall members and capping members to the enclosure member 102.

The axial length of the internally diametered portion 602 that is, the cavity receptacle area for one cell of the battery filter element 100 is shown in FIG. 6 to be slightly longer than that of the adjacent portions in order that both a set of battery cell electrodes and the needed enclosure capping member can both be received in the axial space. In contrast, the axial length of the portion 612 is shown to be small, and is intended to receive only the positive battery end capping member.

Figure 4:
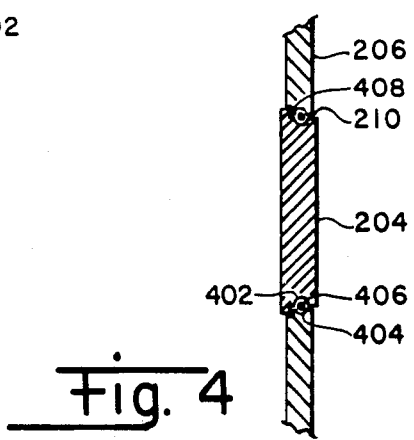
FIG. 4 is a cross-sectional view of a cell interconnecting member and sealing arrangement between interconnecting member and the cell separation wall member for the battery filter element of FIG. 1.

As indicated at 408 in FIG. 4, the cell separation wall member 206 and the other separation wall members are preferably provided with an annular recess region for receiving a mating annular flange of the interconnecting member 204. The size relationships between interconnecting members and separation wall members such as the members 204 and 206 can be appreciated by understanding that the interconnecting members may typically be cut from sheet stock of 0.21 inch thickness and the separation wall members typically made to be of 0.187 inch thickness. By way of this mating flange and annular recess, the electrode interconnecting member 204 is free to move only in one direction with respect to the separation wall member 206. This one direction movement freedom provides a positive stop for the interconnecting member 204 in the separation wall member 206 during assembly and use and, of course, precludes escape of the outermost electrode interconnecting members from pulling on the electrically conductive leads 104 and 106.

The cell-to-cell electrode interconnecting member 204 and the end connecting members are preferably formed of a metal such as nickel in sheet stock form in the case of the above-indicated nickel-cadmium embodiment of the invention. Other metals could, of course, be selected and are preferably used with embodiments of the invention employing electrolytes having other chemical compositions. Electrically conductive leads 104 and 106 may be attached to the outermost interconnecting members by way of brazing, soldering, welding, or other such attachment arrangements. Blind tapped machine screws could also be used for this lead attachment—the blind tapped arrangement precluding leakage of liquid electrolyte through the interconnecting member.

A hole or aperture 208 is shown located centrally in the enclosure capping member 122 and a similar opening is shown in the separation wall member 206 and each of the other separation wall members in FIG. 3. Preferably these apertures are formed by machining, close tolerance molding, or other arrangements by which accurate dimensional control can be maintained. A resilient sealing member 406 is provided around the periphery of the interconnecting members 108, 204 and the other interconnecting members in FIG. 3 in order to seal the opening between the interconnecting members and the apertures 206, 208 and the similar other apertures in FIG. 3. This sealing prevents the leakage of electrolyte fluid and electrical currents between adjacent cells of the battery filter element and to the exterior of the battery filter element. The resilient sealing members can be fabricated from neoprene, butyl rubber, or similar materials and are preferably embodied as a commercially available O-rings. The resilient sealing member 406 can, for example, be in the form of a 1/16 inch thick stock neoprene rubber O-ring having an inner diameter of 1.0 inch. Other resilient and inert materials such as the Silicone rubber manufactured by Dow Corning Corporation of Midland, Mich., and by General Electric Company, may also be used in forming the resilient sealing member 406. The sealing member 406 may also be disposed in other shapes between the interconnecting members and the aperture surfaces. As indicated at 402 and 404 in FIG. 4, receiving grooves which are in the form of annular depressions in both the opening 210 and the electrode interconnecting member 204 are used to house the resilient sealing member 406 and to provide a reasonable cross-sectional area space for resilient member residence. Some annular clearance space is provided between the interconnecting member (e.g., 204) and the apertures (e.g., 210) as is known in the art to be needed for inserting the interconnecting member with the resilient sealing member 406 captured thereon into the apertures. The depth of the grooves 402 and 404 can be adjusted to suit the sealing and fabrication needs of the component parts. Omission of the groove 404 in the separation wall members so that the resilient sealing member 406 rests on a smooth annular surface in the aperture 210 may be desirable in some cases.

A smoothly-curved exterior circumferential shape is preferred for the electrode interconnecting members and electrode to lead interconnecting members, 108 and 204 in FIG. 3, in order that a periphery capable of optimum sealing with the holes or apertures in separation wall members be achieved. Preferably, a circular shape is used at this location, however, other geometric forms such as the ellipse, hexagon, octagon, square, or triangle could be employed. The corner localized stresses required in the resilient sealing member 406 if these other shapes are used makes the attaining of liquid-tight seals more difficult using such shapes.

Use of the interconnecting members 108 and 204 in mating and closely conforming disposition with apertures of the type indicated at 208 and 210 in FIG. 2 provides one of the notable advantages of the present semi-bipolar battery filter element arrangement. By way of the appreciable cylindrical surface areas available at the mating faces of the interconnecting members and separation wall members, tight and reliable yet pliable and compliant seals against electrolyte leakage are achieved while also maintaining desirable short electrical interconnections and low electrical impedances. With the above-described cell enclosure fabrication wherein the separation wall members are permanently and effectively sealed at the periphery and wherein an effective seal at the interconnecting member 204 is also achieved, a notable improvement over the bipolar battery sealing arrangement is therefore possible. In the described battery filter element, moreover, many normal advantages of the bipolar cell are achieved along with the inclusion of a major new advantage—this effective cell-to-cell electrolyte sealing.

The dimensional stability of the interconnecting members with temperature changes and other dimension disturbing effects also contributes to the improved cell sealing of the present invention by limiting the amount of dimensional change or element creep which must be accommodated by the resilient sealing member and the cooperating separation wall member.

Additional details of individual electrode elements of the type shown at 200 and 202 in FIGS. 2 and 3 are included in the FIG. 5 cross-sectional view of an electrode element 500. Once again in FIG. 5, the above indicated nickel-cadmium cell is presumed. Preferably, each of the electrodes in the FIG. 1, FIG. 2, and FIG. 3 apparatus is fabricated using a nickel wire screen 502 having a nickel substrate sintered onto the screen as is indicated in FIG. 5. In the nickel-cadmium embodiment of the invention this screen wire mesh member might, for example, have a 3.3 inch diameter and can be filled with electrode active material in the annular coined region indicated at 506 in FIG. 5. The central circular coined region 504 of about 1.25 inch diameter is usable for attachment of a cell interconnecting or battery terminal member to each electrode element.

As indicated above, the cell interconnecting member 204 is preferably made of large cross-sectional area and of dimensionally stable shape and material. A solid nickel slug is suitable for use as the interconnecting member 204 in a nickel-cadmium embodiment of the invention. The interconnecting member may have a diameter of 1.125 inches and the indicated thickness of 0.210 inch. The solid nickel slug may be attached to the substrate member 502 by means of welding using either spot welding or tungsten inert gas (TIG) welding as is known in the metal fabrication art. Preferably attachment between the slug 204 and the substrate member 502 is of large attachment area in order to achieve both a long-life rigid mechanical anchoring and in order to achieve desiably low electrical resistance between the substrate 502 and the interconnecting member 204—or the electrode to lead interconnecting member 108.

The physical assembly of one positive electrode, one separation wall member, and one negative electrode into a cell can, of course, be achieved by first attaching one electrode substrate to an interconnecting member, locating the resilient sealing member 406 in the groove 402 of the interconnecting member, inserting the interconnecting member through the aperture of a separation wall member and then attaching the second electrode to the free end of the interconnecting member by a second welding—on the opposite side of the separation wall member. The three-layered assembly of a separation wall member sandwiched between two electrodes of opposite polarity can subsequently be inserted into the enclosure member 102 and in turn isolated by electrode separator elements of the type shown at 110 and by adjacent separation wall and electrode assemblies in the fashion indicated for the four cells of FIG. 3. The electrode separator elements 110 are preferably fabricated from a cloth-like unwoven synthetic mat material such as Pellon TM Style 2506, made by Pellon Corp. of New York, NY, which is inert to the electrolyte solution and its byproducts.

It should be realized that one of the notable advantages of cells fabricated in the manner described herein arises from an electrode interconnecting member being centrally located in the surface area of the connected electrodes to provide for short distance radially directed electrode current flow. In the above-indicated electrode dimensions for example, the electrode current flow traverses a radial distance of 1.1 inch or less, and extends over the full 360 degree electrode azimuth surrounding the interconnecting member. This short distance current path of direct orientation is of course, much preferable to the connecting tab arrangement usually employed in automotive and aircraft batteries wherein current flow is directed toward one corner of an electrode and can extend over lengths in the range of 6 inches or more from remote portions of the electrode surface. In addition to these long current paths, the intricate U-shaped path of the current flow in such cells is productive of significant electrical inductance. Both the electrical resistance and the electrical inductance of the present electrode and interconnecting member arrangement are therefore desirable for use in a battery filter element device where low impedances are desired.

The more distributed nature of the current flow around the interconnecting members 108 and 204 in the present battery cell arrangement is also desirable from the viewpoint of reducing the effects of heating produced by large electrode current flows and thereby eliminating or minimizing a failure mode commonly observed in the corner tab connected electrode arrangement.

The pressure relief venting members 114, 116, 118, and 120 in FIG. 1 of the drawing can be fabricated as short lengths of resilient rubber tubing which surround the shaft of a machine screw and are held captive against the enclosure member 102 by the head of the machine screw. Preferably, the characteristics of these vent members such as are determined by tubing type, tubing dimensions, applied screw tension, and the like, are arranged to relieve the pressure within individual battery cell cavity receptacles near 8 psi. Pressures within a battery cell cavity receptacle can arise from heating of the battery components by environmental surroundings and $I^2R$ electrical losses, from gases produced in the charging and discharging of the battery electrodes, as well as from electrolyte decomposition and other causes.

Both the positive nickel and negative cadmium electrodes can be fabricated on wire grid material as shown at 502 in FIG. 5. Wire grid material with sintered substrate formed is available from a number of suppliers of battery components including Eagle Pitcher Industries, Inc. of Colorado Springs, CO. The Eagle Pitcher substrate material is generally of a 0.03 inch thick nickel sinter deposited according to a dry sintering process to have a porosity of about eighty percent. The negative cadmium electrode can be produced using this substrate and the teachings of the patent of D. H. Fritts et al, U.S. Pat. No. 4,242,179. The Fritts fabricated negative electrode is preferably loaded with 6 to 8 grams of active cadmium material and results in a theoretical electrode capacity in the range of 2.5 to 3.1 ampere-hours. The 2.5-3.1 ampere-hours capacity of the negative cadmium electrode is desirably larger than the 1.4 ampere-hour theoretical capacity of the positive nickel electrode in order that each cell of the battery be nickel-limited in nature, nickel limiting in such a battery cell is desirable for reasons of residual polarization at cell discharge.

Test electrodes in the form of cadmium wires immersed in the electrolyte of each cell in physical proximity with one of the electrodes may be helpful in measuring and diagnosing conditions within an assembled battery filter element. Such electrodes can be disposed radially through the enclosure member 102 from each cell cavity receptacle.

The positive nickel electrodes are preferably loaded in accordance with the patent of D. F. Pickett, U.S. Pat. No. 3,827,911, both of which patents are hereby incorporated herein by reference. The nickel electrode loading is peferably modified slightly from the procedure of the Pickett patent by the use of water in lieu of the Pickett-disclosed alcohol and by the addition of cobalt in the amount of 10% to the bath to improve the electrode performance. When loaded with active material having a density in the order of 1.7 grams per cubic centimeter of filled space a 3.3 inch substrate of the type shown at 500 in FIG. 5 provides an electrode capacity of about 1.4 ampere hours.

Figure 7:
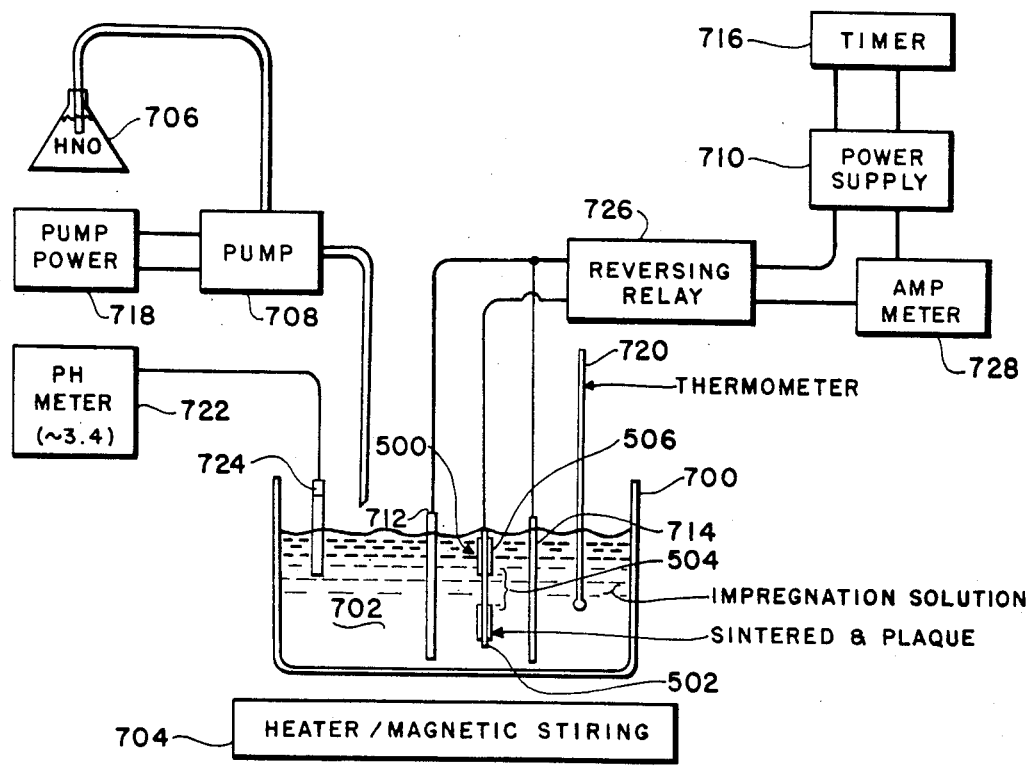
FIG. 7 shows an electrode active material loading apparatus.

A wet process apparatus capable of loading an electrode substrate member 502 with active material in accordance with the above-identified Pickett and Fritts patents is shown in FIG. 7 of the drawings. The FIG. 7 apparatus includes a liquid retention vessel 700, which contains an aqueous solution 702 of electrolyte such as nickel nitrate or cadmium nitrate, depending on the electrode being formed. The solution 702 is subjected to heating and stirring from a combined magnetic stirring and heating apparatus 704 and is maintained at a constant pH with a source of nitric acid 706. The FIG. 7 view also includes an electrode being loaded 500—similar to the electrode 500 in FIG. 5, a pair of counter electrodes 712 and 714, a temperature indicating thermometer 720, and a pH meter and probe 722 and 724 which control operation of a nitric acid pump 708 and its power source 718 in accordance with the pH condition of the aqueous solution 702. The electrode being loaded 500 and the counter electrodes 712 and 714 in FIG. 7 are connected to a power supply 710 by way of a polarity reversing relay 726 and an ammeter 728. The power supply 710 is controlled as to current flow or electrode loading time by a timer 716; the reversing relay 726 is also timed to periodically reverse the polarity of the electrodes 500 and 712-714 for a brief interval during a loading sequence. Table I herein indicates suitable equipment for the FIG. 7 apparatus, and includes additional description of elements in the FIG. 7 apparatus.

A procedure for loading both nickel and cadmium electrodes for the cells of the preferred arrangement of the invention can include the following steps: (1) coining 4×4 inch squares of empty plaque substrate using pressures in the range of 7,000 psi; (2) weighing and number identifying each of the coined plaques; (3) masking the central circular region 504 using a suitable type of plastic tape to inhibit active material loading in this region; (4) immersing the substrate member in the appropriate solution 702 and energizing the loading power supply 710 (the coined area is essentially non-porous and very little active material attaches here—the plaque is 80% void, i.e., a lot of surface area); (5) reversing the electrode polarity using the relay 726 in a 50-second forward, 10-second reverse cycle; (6) maintaining the aqueous solution 702 at the prescribed pH of 3.4 using the feedback loop involving probe 724, meter 722, pump 708 and power supply 718; (7) withdrawing the loaded electrode from the solution 702 and stripping the central taped area; (8) cycling the nickel loaded electrode in a 20-minute discharge followed by 20-minute charge cycle for one hundred forty minutes in a potassium hydroxide battery electrolytes solution (the cadmium electrodes do not require cycling); (9) soaking and washing the electrode in distilled water; (10) determining the loaded active material weight of each electrode formed; (11) segregating the formed electrodes according to ampere-hour capacity to identify sets of similar ampere-hour capacity for use together; and (12) trimming the excess coined area from each electrode. The total surface area is approximately 21 m$^2$, while the excess coined area trimmed is on the order of 0.0048 m$^2$. In the segregation of electrode sets, loaded cadmium material is presumed to provide a capacity of 0.366 ampere-hours per gram of added material; loaded nickel material is presumed of 0.289 ampere-hour capacity per gram. Additional details concerning the fabrication of electrodes are, as indicated above, disclosed in Fritts and Pickett patents incorporated herein by reference.

The polarity in which the reversing relay 726 primarily resides during a loading procedure is, of course, dependent upon the polarity of the electrode being loaded, the loading of a cadmium electrode requires the substrate 502 to reside principally in the positive polarity condition and contra for the nickel electrode. Following the loading and cycling of electrodes as indicated above, assembly of the electrodes around the separation wall members as indicated above in connection with FIGS. 2 and 3, can be accomplished.

The preferred electrolyte for the nickel-cadmium battery embodiment of the invention has been identified as potassium hydroxide in aqueous solution, a 32 percent by weight concentrated solution is preferred. The introduction of electrolyte into a completed battery cell cavity receptacle can be accomplished through the openings receiving the pressure vent members 114, 116, 118, and 120 by subjecting the vent member openings and the cavity receptacle volume to alternate conditions of evacuation and immersion in a solution of potassium hydroxide or other selected electrolyte liquid.

The electrical characteristics achieved with battery filter elements fabricated in accordance with the above embodiment are desirable for use in filtering low voltage high current power supplies of the type described earlier and used in space vehicles. Such electrical characteristics can be more precisely described in terms of multiplies of the "C" rate where "C" is defined as the value of current that will totally discharge a battery in the time of one hour.

Battery filter elements made in accordance with the described embodiment are useful in the presence of charging and discharging pulse currents in the 25 to 35 ampere range—currents which are in excess of 18 times the C rate of the battery described in the above identified copending patent application. The principal limitation at this rate of performance is actually electrolyte heating—to a point approaching boiling. Better electrolyte heat dissipation than is provided by the acrylic plastic cavity receptacle structure could, of course, be arranged to extend this capacity.

Operation with currents in this 25 to 35 ampere range with a four cell battery filter element and depth of discharge (DOD) values in the range of 0.05 to 0.07 also provides energy storage densities in the range of 40 joules per pound, a value some forty times greater than can be achieved with electrolytic capacitors for long-life space applications. The effective energy density increases almost linearly with DOD for values in the 0.01 to 0.08 range.

Terminal voltage for the battery filter element can be reasonably expressed by the equation:

$$V(t)=E_o-4iR_3-4iR_2[1-\exp(-t/R_2C_2)]$$

In this equation the presence of four series connected cells is presumed and the resistances and capacitances for the nickel electrodes are neglected in view of their small magnitude with respect to cadmium electrode parameters. Symbols are defined below.

The electrical characteristics of the described embodiment battery filter element also include effective initial cell capacitance in the range of 11 farads in each of the four cells of the described battery filter element; actually double layer capacitance values of 5000 farads and 11 farads in a particular cell are to be expected, according to calculations. Since the two double layer capacitances are electrically series connected an effective capacitance, $C_2$ in the above equation, that is near the lower value of 11 fards is achieved.

Internal resistance values in the range of 20 to 60 milliohms for the electrolyte and electrode conductor resistances, $R_3$ in the above equation, and in the range of 50 to 60 milliohms for the double layer capacitance shunted resistances, $R_2$ in the above equation, are also to be expected from the described embodiment battery filter element. These values are for a four-cell arrangement and contemplate disposition of the resistances as described and shown in the copending patent application.

At a 5 C discharge rate the Faradaic component of voltage change at the terminals of the four-cell example, that is the change of voltage in the ideal battery shown in the circuit of the copending patent application is found to be small and on the order of 0.14 millivolt. The limited magnitude of this change component allows its neglect in most considerations of the battery filter element.

By way of the low resistances, large capacitance, relatively fixed voltage, and large current handling, capabilities attributable to the described battery filter element it can be observed that desirable pulse current filtering in power supply and other electrical network locations are feasible with this component. These desirable electrical properties are, of course, in addition to the considerable weight and energy storage density improvements enabled by the described apparatus. Other characteristics of the described embodiment battery filter element including graphs and test results information are contained in either the academic thesis or the technical report identified above and incorporated herein by reference.

Modifications of the described embodiment apparatus are possible to achieve even more desirable properties. The use of improved electrolyte cooling has been described above and other improvements such as in the composition and construction of electrodes and the composition and construction of cell cavity receptacles and battery filter element enclosure structures are also possible. The described embodiment has emphasized the attainment of low electrical impedances and the attainment of these low impedances in a favorable weight and volume environment; it is of course possible to emphasize the attainment of greater energy storage capability in the battery filter element as would be desirable where the load and energy sources involved call for a standby energy reserve in the battery filter element in addition to the waveform correction heretofore emphasized. Day and night space vehicle exposure, for example, would cell for modifications of this nature.

Depth of discharge considerations, energy density characteristics, cycle life, double layer capacitance properties and electrical element representation of cells made in accordance with the present invention are discussed in the above-referenced copending patent application, which has been incorporated by reference herein. Generally, battery filter elements made in accordance with the above disclosure are found to provide improved capability with respect to limiting combinations of these characteristics.

The present disclosure has described the physical attributes of a battery filter element usable in lieu of an electrolytic capacitor for storing energy in power supply filtering apparatus. The disclosed battery filter element is shown to have notable advantages over the conventional electrolytic capacitor when used in such apparatus, including advantages of energy density and filter network weight. The disclosed battery filter element may be considered to be in the nature of a pseudo-bipolar battery having many of the advantages of a fully bipolar cell structure, but with improved electrolyte seal capability in the electrode peripheral region and in the cell interconnecting regions.

While the apparatus and method herein described constitute a preferred embodiment of the invention, it is to be understood that the invention is not limited to this precise form of apparatus or method, and that changes may be made therein without departing from the scope of the invention, which is defined in the appended claims.

TABLE I

Fabrication/Testing Equipment (1) Cole Palmer Pump Model 7013 (708)
(1) Cole Palmer Pump Power Supply—Master Flux Controller (724)
(1) Fisher pH Meter Model 650 (722)
(1) Fisher Heater/Magnetic Stirring Plate Model 310T (704)
(1) Hewlett Packard 4328A Milliohm Meter
(1) Hewlett Packard 6263B Power Supply 20 v/10 a (710)
(2) Hewlett Packard 6012A DC Power Supplies 0-60 v/0-50 a, 1000 w [302]
(1) Hewlett Packard 7418A 8-Channel Recorder with 5-8801A, 1-8802A, and 2-8803A amplifiers
(2) Kiethley 172A Digital Multimeters
(1) Reversing Relay (50 seconds forward, 10 seconds reverse) (726)
(1) Fabricated Timer Model (730)
(1) Power/Mate Corp Lectra-Load II LL300B 50 v, 300 a, 1250 w [304]
(1) Tektronix Oscilloscope AN/USM 425
(1) Transistor Devices Inc. Solid State Load Dynaload 50 v, 15 a, 100 w [304]
(1) Transistor Devices Inc. Solid State Load DLP-50-60-1000 50 v, 60 a, [304]
(2) Wavetek Voltage-Controlled Generators VCG Model III [306]
(1) Weston Ammeter Model 901 [728]

We claim:

1. Low impedance electrical filter battery apparatus comprising:

a peripheral enclosure member;

a separation wall member located centrally within said peripheral enclosure member, sealed with said enclosure member at a separation wall perimeter portion, and defining first and second battery cell cavity receptacles within said enclosure member, said separation wall member including a central aperture communicating between said cavity receptacles;

a first battery cell electrode of a first electrical polarity located within said first battery cell cavity receptacle adjacent a first face of said separation wall member;

a second battery cell electrode of second electrical polarity located within said second battery cell cavity receptacle adjacent the second face of said separation wall member;

an electrically conductive connector member coupled with a central portion of said first cell electrode in said first battery cell cavity receptacle, passing through said aperture central of said separation wall member, and attachment coupled with a central portion of said second cell electrode in said second battery cell cavity receptacle;

means surrounding said electrically conductive connector member including a resilient member disposed contacting both an external circumference portion of said connector member and the opposed internal periphery of said separation cell central aperture for sealing said connector member with said separation wall member central aperture and precluding electrolyte transfer and electrolyte conducted current flow between said cavity receptacles;

a third battery cell electrode of said second electrical polarity located within said first battery cell cavity receptacle adjacent said first electrode;

a fourth battery cell electrode of said first electrical polarity located within said second battery cell cavity receptacle adjacent said second electrode;

first and second quantities of battery cell electrolyte located intermediate said first and third and said second and fourth electrodes in said first and second cell cavities, respectively; and means for communicating electrical currents with said third and fourth cell electrodes;

whereby electrical impedance minimizing electrode radial current flow and short interconnecting lengths are achieved in combination with reliable electrolyte containment and cavity receptacle isolation in a battery of said cells.

2. The apparatus of claim 1 wherein said battery cell electrodes are planar in configuration.

3. The apparatus of claim 2 wherein said electrodes are comprised of a porous metallic plaque substrate member impregnated with a first electrode material for electrodes of said first polarity and a second electrode material for electrodes of said second polarity.

4. The apparatus of claim 3 wherein said metallic plaque substrate members are each comprised of woven nickel wire mesh, supporting a sintered nickel porous layer, and said connector member is comprised of metallic nickel.

5. The apparatus of claim 4 wherein said sintered layer is impregnated with nickel oxide hydroxide to form a positive polarity electrode.

6. The apparatus of claim 5 wherein and said sintered layer is impregnated with cadmium hydroxide to form a negative polarity electrode.

7. The apparatus of claim 6 wherein the total mobile charge carrier capacity of said nickel oxide hydroxide is less than that of said cadmium and said battery cells are thereby of nickel limited total discharge characteristic.

8. The apparatus of claim 2 wherein said electrically conductive connector member coupled with said first and second cell electrodes is circular in cross-section and of metallic composition.

9. The apparatus of claim 8 wherein said connector member and said metallic plaque substrate member are joined by a welded attachment connection.

10. The apparatus of claim 8 wherein said means for sealing includes an annular groove received in said connector member and a resilient sealing member received in said groove intermediate said connector member and said separation wall central aperture.

11. The apparatus of claim 10 wherein said resilient sealing member comprises a rubber O-ring.

12. The apparatus of claim 10 wherein said means for communicating electrical currents with said third and fourth cell electrodes includes second and third electrically conductive connectors connecting said third and fourth electrodes with additional battery cells located within said peripheral enclosure member.

13. The apparatus of claim 10 wherein said means for communicating electrical currents includes electrically conductive connectors passing through exterior walls of said battery apparatus to external electrical circuit apparatus.

14. The apparatus of claim 10 wherein said electrolyte is a liquid.

15. The apparatus of claim 14 further including means for retaining said first and second electrodes in predetermined physical separation and in contact with said liquid electrolyte.

16. The apparatus of claim 14 wherein said means for retaining includes porous electrically insulating electrode separation means intermediate said first and third and said second and fourth electrode members.

17. The apparatus of claim 1 further including pressure relief means for limiting the thermal and gas generated pressure within said cell cavities to a predetermined value.

18. The apparatus of claim 1 wherein said enclosure member and said separation wall members are each comprised of acrylic polymer material.

19. A low-impedance semi-bipolar nickel cadmium battery cell comprising:

a cylindrically shaped container member composed of acrylic polymer material;

a pair of circular wafer shaped cylinder closure members of acrylic polymer material located at axially displaced positions along the length of said container member, said closure members including peripheral portions conforming with and sealable with selected surface portions of said container member and defining a battery cell cylindrical receptacle within said container;

a planar circular positive polarity battery cell electrode member including an active nickel oxide hydroxide material film suspended in a metallic nickel sinter screen area of a mesh substrate and located within said cylindrical receptacle;

a planar circular negative polarity battery cell electrode member including an active cadmium hydroxide material film suspended in a metallic nickel sinter screen mesh area of a substrate and located adjacent said positive polarity electrode member within said cylindrical receptacle;

a pair of metallic nickel connector members of smooth curvatuve cross-section passing through a centrally disposed aperture of each said closure member and each welded to a central portion of said positive and negative nickel electrode screen mesh substrate in said battery cell cylindrical receptacle;

rubber O-ring sealing means located in an annular groove surrounding the cross-sectional periphery of each said connector member and between said connector member and the lateral surface of said closure member aperture for inhibiting liquid electrolyte communication and electrolyte current flow transverse of said aperature;

a potassium hydroxide aqueous electrolyte solution contained within said cylindrical receptacle and in wetting contact with said electrode members;

circular electrode separator means located between said electrode members in said electrolyte solution for maintaining a minimum physical separation between said electrode members, said separator means including a chemically inert porous cloth portion; and pressure relief venting means communicating between said cavity receptacle and the atmosphere for relieving pressure within said receptacle at predetermined levels of attained pressure.

20. The apparatus of claim 19 further including:

an additional battery cell comprised of an additional of said closure members located in said container and defining with one of said pair of closure members a second battery cell cylindrical receptacle;

a second each of said positive and negative electrode members located in said second receptacle, one of said second electrodes being connected with one of said pair of nickel connector members within said second receptacle;

a third of said nickel connector members connected with the remaining of said second electrodes and passing through said additional closure member; and electrical circuit means for conveying electrical current to the external of said connector members.

21. The apparatus of claim 19 further including additional of said battery cells located within said container member and comprising a multiple cell battery.

22. The apparatus of claim 21 wherein each successive of said cylindrical closure members is of larger periphery than the preceding closure member and wherein the interior periphery of said cylindrically shaped container member is also of different periphery along the axial length thereof;

whereby said closure members are receivable within said container member interior from the larger periphery one end thereof and in increasing closure member periphery sequential order.

* * * * *